United States Patent
Ito et al.

(10) Patent No.: US 9,464,717 B2
(45) Date of Patent: Oct. 11, 2016

(54) PISTON RING

(75) Inventors: Michihiro Ito, Saitama (JP); Naoyuki Akimoto, Saitama (JP); Iwao Hiraishi, Saitama (JP); Makoto Kajiwara, Saitama (JP); Atsushi Chiba, Saitama (JP)

(73) Assignee: NIPPON PISTON RING CO., LTD., Saitama, Saitama (JP)

( * ) Notice: Subject to any disclaimer, the term of this patent is extended or adjusted under 35 U.S.C. 154(b) by 73 days.

(21) Appl. No.: 13/575,031

(22) PCT Filed: Jan. 28, 2011

(86) PCT No.: PCT/JP2011/051801
§ 371 (c)(1),
(2), (4) Date: Jul. 25, 2012

(87) PCT Pub. No.: WO2011/093464
PCT Pub. Date: Aug. 4, 2011

(65) Prior Publication Data
US 2013/0043659 A1    Feb. 21, 2013

(30) Foreign Application Priority Data

Jan. 29, 2010   (JP) .................................. 2010-019357

(51) Int. Cl.
*F16J 9/26*    (2006.01)
*F16J 9/20*    (2006.01)

(52) U.S. Cl.
CPC .... *F16J 9/20* (2013.01); *F16J 9/26* (2013.01)

(58) Field of Classification Search
CPC ...................................... F16J 9/20; F16J 9/26
USPC .................................................. 277/440–444
See application file for complete search history.

(56) References Cited

U.S. PATENT DOCUMENTS

| | | | |
|---|---|---|---|
| 8,047,174 B2 | 11/2011 | Iwasaki et al. | |
| 8,235,393 B2 * | 8/2012 | Esser et al. .................... | 277/440 |
| 2002/0175476 A1 * | 11/2002 | Chinou et al. ................ | 277/440 |
| 2004/0040436 A1 | 3/2004 | Aizawa et al. | |

(Continued)

FOREIGN PATENT DOCUMENTS

| | | |
|---|---|---|
| JP | 2003-113941 | 4/2003 |
| JP | 2004-092714 | 3/2004 |
| JP | 2008180218 | 8/2008 |
| JP | 2008-241032 | 10/2008 |
| JP | 2011179573 | * 9/2011 |

OTHER PUBLICATIONS

Japanese Office Action, dated Feb. 13, 2015, in corresponding Japanese Patent Application No. 2011-551939.
International Search Report—PCT/JP2011/051801—Apr. 5, 2011.

*Primary Examiner* — Vishal Patel
*Assistant Examiner* — Thomas Neubauer
(74) *Attorney, Agent, or Firm* — Muncy, Geissler, Olds & Lowe, P.C.

(57) ABSTRACT

Provided is a piston ring such that it is possible to sufficiently inhibit adhesive wear when the piston ring is mounted to a piston for a diesel engine in which at least the piston ring groove in the piston is formed from steel or cast iron. Disclosed is a piston ring mounted to a piston for a diesel engine, wherein the load length ratio (Rmr2) (in accordance with JIS B0601:2001) of the top surface and bottom surface of the piston ring satisfies each of the following conditions: Rmr2 (0.5%, 0.3[mu]m)=20% and Rmr2 (0.5%, 0.4[mu]m)=40%.

11 Claims, 2 Drawing Sheets

(56) References Cited

U.S. PATENT DOCUMENTS

| | | | |
|---|---|---|---|
| 2007/0252338 A1* | 11/2007 | Maier et al. | 277/443 |
| 2008/0256794 A1* | 10/2008 | Maier | 29/888.07 |
| 2009/0151689 A1 | 6/2009 | Iwasaki et al. | |
| 2012/0242047 A1* | 9/2012 | Sasaki et al. | 277/443 |
| 2012/0248711 A1* | 10/2012 | Iwashita et al. | 277/444 |
| 2012/0261886 A1* | 10/2012 | Chiba et al. | 277/443 |

* cited by examiner

PISTON RING

TECHNICAL FIELD

The present invention relates to a piston ring which is used as a combination with a piston for a diesel engine.

BACKGROUND ART

Along with the market demand for longer lives and better fuel economy of automobile engines in recent years, there is a demand for a piston ring for use in those engines to have a thin piston ring width, a light weight, a low tension, and a low friction loss. Here, a piston ring is mounted on a piston for realizing smooth reciprocating movement of the piston in a cylinder and sealing hot combustion gas. A piston mounted with a piston ring forms a combustion chamber in a cylinder, and an explosive pressure, which is generated by the combustion of fuel in the combustion chamber, is converted into rotation of a crankshaft. Accordingly, a piston ring to be mounted on a piston is required to have a function of stably sealing the hot combustion gas for a long period of time withstanding explosive shocks in the concerned combustion chamber. If such sealing performance by a piston ring cannot be improved, that may become a factor to cause a deterioration of engine output, an increase of oil consumption, and the like.

To improve the shock resistance and the gas sealing performance described above, there are various kinds of piston rings corresponding to features of engines, including those made of materials which can avoid abnormal wear during initial running-in, those having shapes which are effective in preventing blow-by (blowing through) of gas and are suitable from a viewpoint of lubrication theory, and the like. For example, in the case of pistons for diesel engines, as the combustion pressure of internal combustion engine rises due to recent emission regulation control, the load imposed on the piston has been increasing, and from the need to withstand such a severe use condition, the material for the piston ring groove has become steel or cast iron. Therefore, if a piston ring which is made of the same material as that of the piston ring groove is mounted, adhesive wear is likely to occur.

In order to suppress the occurrence of the concerned adhesive wear, a piston ring to be mounted on a piston for a diesel engine is configured to have a shape provided with an inclination angle, which is the same as that of the concerned piston ring groove, on the side of the top face and/or bottom face thereof. If adhesive wear occurs between the piston and the piston ring, the sealing performance between the top and bottom faces of the piston ring and the piston ring groove of the piston will degrade, becoming a factor to cause deterioration of engine output, increase of oil consumption, and the like.

To avoid the problems described above, for example, Patent Literature 1 (Japanese Patent Laid-Open No. 2004-92714) discloses a combination of piston and piston ring, which is excellent in durability, and is suitably used in a high power internal combustion engine involving a high combustion temperature and combustion pressure like a high-power engine. To be specific, the combination of piston and piston ring of Patent Literature 1 is configured such that a piston in which at least the piston ring groove is made of steel, is mounted with a piston ring which is made of cast iron and is formed with a hard coating at least on the outer peripheral sliding surface. Further, Patent Literature 1 discloses that making the piston ring out of cast iron will result in the formation of irregularities on the top and bottom faces of the concerned piston ring due to the presence of graphite peculiar to cast iron, so that these irregularities contribute to oil collection, as well as graphite acts as a self-lubricating substance, thus suppressing the occurrence of adhesion between itself and the piston ring groove made of steel material which is the mating member, thereby obtaining excellent durability.

CITATION LIST

Patent Literature

[Patent Literature 1]
Japanese Patent Laid-Open No. 2004-92714

SUMMARY OF INVENTION

Technical Problem

As described above, the combination of piston and piston ring relating to Patent Literature 1 concerns the suppression of the occurrence of adhesion on the top and bottom faces of the piston ring. In this way, up to now, countermeasures have been taken to suppress the occurrence of adhesive wear at the contact surface between the piston ring groove and the top and bottom faces of the piston ring. However, while in the combination of piston and piston ring relating to Patent Literature 1, as the condition of the concerned combination, materials of both the parts are limited to the combination of a piston in which at least the piston ring groove is made of steel, and a piston ring made of cast iron, the piston ring of Patent Literature 1 has not been subjected to a study to sufficiently prevent adhesion from a view point of the surface quality of the top and bottom faces of the piston ring when it is mounted on a piston in which at least the piston ring groove is made of steel.

From what has been described so far, the present invention has its object to provide a piston ring which can sufficiently suppress the occurrence of adhesive wear when mounted on a piston for a diesel engine, in which at least the piston ring groove is made of steel or cast iron.

Solution to Problem

After having diligently conducted research, the present inventors eventually have solved the above described problems by arranging the surface properties of the top and bottom faces, which is opposite to the side faces of the piston ring groove of a piston, to be a shape that satisfies a predetermined condition. Hereafter, the present invention will be described.

A piston ring relating to the present invention is a piston ring to be mounted on a piston for a diesel engine, wherein a load length ratio Rmr2 (conforming to JIS B0601:2001, which corresponds to ISO 4287:1997) of a surface at a top face and a bottom face of the piston ring satisfies each condition of Formula (1) and Formula (2) shown in Expression 1 below:

[Expression 1]

$$Rmr2(0.5\%, 0.3\mu m) \geq 20\% \qquad (1)$$

$$Rmr2(0.5\%, 0.4\mu m) \geq 40\% \qquad (2).$$

The piston ring relating to the present invention is preferably configured such that when the above-described Rmr2 is represented as Rmr2(Rmr(Co), z) (where, Rmr(Co) is a load length ratio (%) after specified initial wear, and z is a depth (μm) from a cut level Co corresponding to the Rmr (Co)), a gradient of a straight line connecting data points of each of the Rmr2 where the z is 0.1 μm and 0.3 μm is not less than 80 in a relationship with the z when the Rmr(Co) is 0.5%, in a coordinate system with the z being an x-axis and with the Rmr2 being a y-axis.

The piston ring relating to the present invention is preferably configured such that 10-point average roughness RzJIS (JIS B 0601:2001) of the surface at the top face and the bottom face of the piston ring is 0.2 μm to 2.0 μm.

The piston ring relating to the present invention is preferably configured such that a hard layer is formed on the top face and the bottom face of the piston ring, and Vickers hardness (HV) in the hard layer is 700 HV0.1 to 3000 HV0.1.

The piston ring relating to the present invention is preferably configured such that the piston ring is made of steel or cast iron, and the hard layer formed on the top face and the bottom face of the piston ring is selected from any one or more of a nitrided layer, a chromium plated layer, a PVD treated layer, a CVD treated layer, and a DLC layer.

The piston ring relating to the present invention is preferably configured such that a cross-section of the piston ring along a piston axis direction has a shape of any of a rectangular shape, a keystone shape, and a half-keystone shape.

The piston ring relating to the present invention is preferably used as a combination with a piston in which at least a piston ring groove is made of steel or cast iron.

Advantageous Effects of Invention

A piston ring relating to the present invention can sufficiently suppress the occurrence of adhesive wear, and also suppress the increases of oil consumption and the amount of blow-by gas for a long period of time by making the surface quality of the top face and bottom face of the piston ring satisfy a condition of the load length ratio Rmr2 defined in the present invention.

DESCRIPTION OF EMBODIMENTS

The present invention will be described in more detail hereafter while showing preferable embodiments of the piston ring relating to the present invention by using the drawings.

Figure 1:
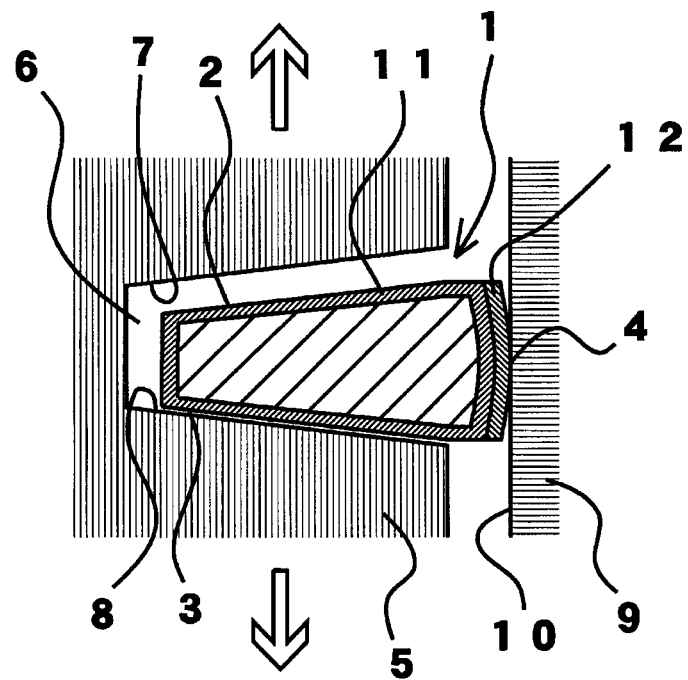
FIG. 1 is a schematic cross-sectional view taken along axial direction to illustrate a state in which a piston ring relating to the present invention is mounted in a piston ring groove.

FIG. 1 is a schematic cross-sectional view taken along axial direction to illustrate a state in which a piston ring relating to the present invention is mounted in a piston ring groove. As shown in FIG. 1, in a state of being mounted in a piston ring groove 6, a piston ring 1 fills a gap of about several tens of microns between a cylinder 9 and a piston 5 to seal combustion gas, and a sliding surface 4 of the piston ring, which is pressed against a cylinder inner wall surface 10 by its own tension, appropriately controls the thickness of an oil film through the reciprocating movement of the piston 5. Moreover, as the result of the piston ring 1 following the reciprocating movement (the arrow direction in the figure) of the piston 5 while being in contact with the cylinder inner wall surface 10 via the oil film, the piston ring 1 is caused to move up and down in the piston ring groove 6 so that contacts between a top face 2 and a bottom face 3 of the piston ring 1, and a top face 7 and a bottom face 8 of the piston ring groove, respectively, are repeated. In this event, if it is assumed that a piston ring made of steel is used in the piston ring groove 6 made of steel, adhesive wear will occur at a contact portion between the top face 2 and the bottom face 3 of the piston ring, and the top face 7 and the bottom face 8 of the piston ring groove 6, respectively.

As will be understood from FIG. 1, if adhesive wear occurs at a contact portion between the top face 2 and the bottom face 3 of the piston ring, and the top face 7 and the bottom face 8 of the piston ring groove 6, respectively, a clearance will occur in a state in which either of the top face 2 or the bottom face 3 of the piston ring is in contact with the top face 7 or the bottom face 8 of the piston ring groove 6, causing increases in oil consumption and the amount of blow-by gas. Therefore, surface roughness of the top face 7 and the bottom face 8 of the piston ring groove, and the top face 2 and the bottom face 3 of the piston ring 1, which are to be in contact with the piston ring groove, become an important condition. It is noted that although the piston ring 1 shown in FIG. 1 is of a kind of so-called keystone ring, which has a wedge-shaped cross-section with an inclination on the top and bottom faces of ring, the piston ring of the present invention will not be limited to such a shape. For example, the piston ring of the present invention may be one having a kind of shape, so-called half-keystone ring in which the bottom face side of the piston ring is formed substantially perpendicular to a cylinder axis and only the top face side is provided with an inclination, or one having a rectangular shape.

The piston ring of the present invention is characterized in that a load length ratio Rmr2 (conforming to JIS B0601: 2001) of a surface in the top face and the bottom face of the piston ring shown in FIG. 1 satisfies the conditions of Formula (1) and (2) shown in the following Expression 1.

[Expression 1]

$$Rmr2(0.5\%, 0.3\mu m) \geq 20\% \quad (1)$$

$$Rmr2(0.5\%, 0.4\mu m) \geq 40\% \quad (2)$$

Figure 2:
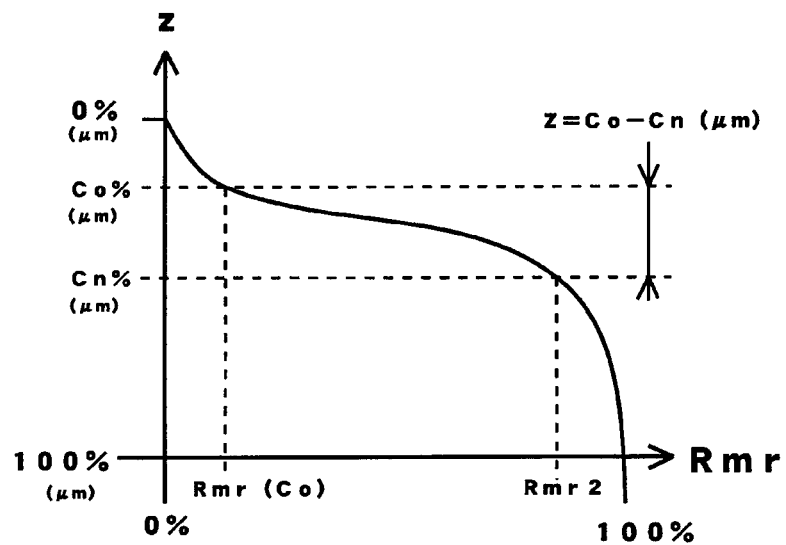
FIG. 2 is a diagram to illustrate a load length ratio Rmr2 by using a load curve created from a roughness curve.

Here, the load length ratio Rmr2 will be described by using the drawing. FIG. 2 is a diagram to show a load curve created from a roughness curve to illustrate the load length ratio Rmr2. It is noted that a load curve is a curve created by determining a load length ratio Rmr at each cut level conforming to JIS B 0601:2001 from a roughness curve, with the load length ratio Rmr (%) being the abscissa, and the cut level (the height of cutting (unit: % or μm)) being the ordinate. The load length ratio Rmr2 refers to a load length ratio (%) after wear has occurred by a depth z(=Co−Cn) μm from a cut level Co corresponding to a load length ratio Rmr(Co) (%) after a predetermined initial wear on the load curve and is, in this case, denoted as "Rmr2(Rmr(Co), z)".

The piston ring of the present invention, among the ideas to decrease the roughness of the top face and the bottom face thereof, further increases stability regarding the effect of suppressing adhesion by configuring the top face and the bottom face thereof to have a surface quality of the condition shown in the above-described Formula (Expression 1). If the surface roughness of the top face and the bottom face of the piston ring, which are to come into contact with the top face and the bottom face of the piston ring groove, is large, aggressiveness of the piston ring against the piston ring groove increases, and adhesive wear becomes more likely to occur. The piston ring of the present invention can decrease the aggressiveness of the piston ring against the piston ring groove and sufficiently suppress the occurrence of adhesive wear by configuring the load length ratio Rmr2 to be within a condition range defined in the present invention concerning the surface quality of the top face and the bottom face thereof. Therefore, adopting the piston ring of the present invention makes it possible to effectively suppress the increases of oil consumption and blow-by gas amount.

Moreover, in the piston ring of the present invention, the load length ratio Rmr2 can be represented as Rmr2(Rmr (Co), z) (where a load length ratio (%) after a predetermined initial wear is Rmr(Co), and a depth (w) from the cut level Co corresponding to the concerned Rmr(Co) is z). Further, in this case, the concerned load length ratio Rmr2 is preferably determined such that in the relationship with the concerned z when the concerned Rmr(Co) is 0.5%, the gradient of a straight line that connects data points of each concerned Rmr2 where the concerned z is 0.1 µm and 0.3 µm is not less than 80 in a coordinate system in which the concerned z is an x-axis, and the concerned Rmr2 is a y-axis.

The conditions for surface quality of the top face and the bottom face of the piston ring of the present invention are set for the load length ratio Rmr2 on the basis of the case where Rmr(Co) is 0.5%. This is based on an empirical rule that setting conditions with reference to a case where Rmr(Co) is 0.5% makes it possible to stably achieve the effects of decreasing the aggressiveness of the piston ring against the piston ring groove, and sufficiently suppressing the occurrence of adhesive wear. Then, the piston ring of the present invention preferably satisfies the condition that, in the relationship with z when Rmr(Co) of the top face or the bottom face is 0.5%, a gradient a of a straight line connecting two data points of each concerned Rmr2 where the concerned z is 0.1 µm and 0.3 µm is not less than 80 in a coordinate system where the concerned z is an x-axis and concerned Rmr2 is a y axis. Since satisfying this condition will remarkably improve the lubrication-oil retaining capability of the piston ring, thereby achieving excellent wear resistance and adhesion resistance, it is possible to further exert effects of reducing oil consumption and blow-by gas amount.

Further, the piston ring of the present invention is preferably configured such that 10-point average roughness RzJIS (JIS B 0601:2001) of the surface at the top face and the bottom face thereof is 0.2 µm to 2.0 µm. In this way, defining the surface roughness of the top face and the bottom face of the piston ring in conjunction with the load length ratio Rmr2 described above makes it possible to quite effectively reduce a friction damage at the contact surfaces with the top and bottom faces of the piston ring groove, thereby stabilizing the piston ring sliding behavior. As a result, even if the piston ring of the present invention is mounted on a piston in which at least the piston ring groove is made of steel or cast iron, it is possible to further suppress the increases of oil consumption and blow-by gas amount.

Here, it is not preferable when the 10-point average roughness RzJIS (JIS B 0601:2001) of the surface at the top face and the bottom face of the piston ring is less than 0.2 µm, since there are problems such as an increase of cost associated with the introduction of facilities for forming roughness profiles, and a decline of the yields of products. Moreover, it is not preferable when the 10-point average roughness RzJIS (JIS B 0601:2001) of the surface at the top face and the bottom face of the piston ring exceeds 2.0 µm, since a large surface roughness will decline initial running-in capability, and at the same time convex portions of the top face and the bottom face of the piston ring become more likely to cause friction damage against the top and bottom faces of the piston ring groove being in contact therewith.

Moreover, it is preferable that the piston ring of the present invention has a hard layer formed on the top face and the bottom face thereof, and Vickers hardness (HV) in the hard layer is 700 HV0.1 to 3000 HV0.1. Forming a hard layer on the top face and the bottom face of the piston ring of the present invention enables the improvement of durability of the piston ring. It is noted that although the surface roughness of the piston ring slightly increases as the result of forming the concerned hard layer, thereby slightly affecting the adhesive wear that occurs at the contact surfaces between the piston and the piston ring, such effect is a level that does not cause problem in the piston ring of the present invention in which the surface roughness is inherently specified to be small.

Here, if Vickers hardness (HV) in the hard layer formed on the top face and the bottom face of the piston ring is less than 700 HV0.1, it is not possible to sufficiently improve the durability of the piston ring. Further, if Vickers hardness (HV) in the hard layer formed on the top face and the bottom face of the piston ring exceeds 3000 HV0.1, since the top face and the bottom face of the piston ring become too hard, thus being embrittled, it will be lacking in impact resistance, which is not preferable.

Moreover, it is preferable that the piston ring of the present invention is made of steel or cast iron, and the hard layer to be formed on the top face and the bottom face of the concerned piston ring is selected from any one or more of a nitrided layer, a chromium plated layer, a PVD treated layer, a CVD treated layer, and a DLC layer. In this way, by forming a hard layer on the top face and the bottom face of the piston ring, it is made possible to achieve a long life of the piston ring made of steel or cast iron as required as an internal combustion engine, even when used in combination with a piston in which at least the piston ring groove is made of steel or cast iron. It is noted that as shown in FIG. 1, the concerned hard layer 11 may be formed not only on the top face and the bottom face of the piston ring which are to come into contact with the piston ring groove, but also on all the surfaces including the sliding surface in sliding relation with the cylinder inner wall surface. In this way, by forming the hard layer 11 on all the surfaces of the piston ring, the durability of the piston itself is improved. Accordingly, on the surface of the hard layer 11 so far described, a surface treatment may be further applied using a technique of chromium plating, composite chromium plating, composite plating, thermal spraying, physical vapor deposition (PVD), chemical vapor deposition (CVD) or the like. Moreover, the piston ring of the present invention may be provided with a diamond-like carbon layer (hereafter, referred to as a "DLC layer") on the outer most layer of the top face and the bottom face which are formed with the nitrided layer, the chromium plated layer, or the PVD treated as described above. This DLC layer is known as a low-friction material having a low friction coefficient, and further forming a DLC layer on the hard layer formed on the concerned top face and bottom face enables a drastic improvement in the wear resistance of the piston ring. It is noted that as shown in FIG. 1, the piston ring of the present invention may be provided with a DLC layer on an outer peripheral sliding surface 4 of the ring as a wear resistant layer 12.

In general, a piston ring is used by being mounted on a piston as a set of rings including a top ring, a second ring, and an oil ring. The piston ring of the present invention may be suitably used either for the top ring or the second ring. In this connection, the top ring and the second ring are made up of a material excellent in heat resistance since they are subject to heat from combustion gas and the piston, and also of a material which is appropriate in terms of wear resistance and scuffing resistance characteristics such that deterioration of engine output and increase in lubrication oil consumption will not occur. For example, those widely used for the top ring include a ring made of martensitic stainless steel treated with nitriding on the sliding surface in sliding relation with the cylinder liner, and a ring made of SWOSC-V steel treated with chromium plating on the sliding surface in sliding relation with the cylinder liner. Moreover, for the second ring, a ring made of high-class cast iron or a ring made of alloy cast iron is adopted, and particularly rings made of high-class cast iron applied with chromium plating on the sliding surface are widely used.

Further, the piston ring of the present invention preferably has an axial cross-section of any of a rectangular shape, a keystone shape, or a half-keystone shape. Here, if the piston ring has an axial cross-section of a rectangular shape, it is possible to suppress blow-by gas which is high-pressure combustion gas that flows out from the combustion chamber side to a crank shaft side. Further, if the piston ring has an axial cross-section of a shape in which an inclination is provided either of the top face or the bottom face of the piston ring, like a keystone shape or a half-keystone shape, because of the movement of the piston ring in the radial direction in the piston ring groove, the top face or the bottom face provided with an inclination of the piston ring comes into inclined contact with sludge and carbon deposited in the groove, thereby allowing the sludge and the like to be easily crushed or scraped off. As a result of this, adopting a piston ring with an axial cross-section having a keystone shape or a half-keystone shape makes it possible to prevent a situation in which so-called "stick" in which sludge and the like deposited in the piston groove adhere or stick to the ring, thereby immobilizing the ring. In this connection, if stick occurs with the piston ring, the piston ring becomes more likely to break, the amount of blow-by gas increases, and in addition to that, there is a risk that the oil control function thereof deteriorates and furthermore scuffing occurs on the piston.

As so far described, the piston ring of the present invention is preferably used in combination with a piston in which at least the piston ring groove is made of steel or cast iron. By configuring that at least the piston ring groove is made of steel or cast iron, it is possible to achieve a long life required for an internal combustion engine. In this connection, materials preferably used for the piston ring groove include Ni-resist cast iron, nodular graphite cast iron, Chrome-Molybdenum steel (SCM415H, SCM418H, SCM420H, SCM425H, SCM435H, SCM440H, SCM445H) in JIS standard, and the like.

It is noted that the piston ring of the present invention can sufficiently suppress adhesive wear even in the combination with a piston having a piston ring groove of the same material by satisfying the conditions set upon the surface quality of the top face and the bottom face thereof defined in the present invention. Further, in a combination with a piston in which at least the piston ring groove is made of steel or cast iron, the base material of the piston ring of the present invention is resistant to scoring, and also will not deteriorate the gas sealing function of the piston ring because of a small thermal expansion difference, enabling to effectively prevent the occurrence of blow-by gas.

Hereafter, the present invention will be specifically described by showing Examples and Comparative Examples. It is noted that the present invention will not be limited to the following Examples.

EXAMPLES

Confirming Test for Wear Amount of Piston Ring Groove

In the present confirmation test for wear amount, an actual machine test of a 6-cylinder diesel engine having a displacement of 10000 cc was conducted on piston ring grooves in which a top ring was mounted, to confirm whether or not difference exists in the wear amount of piston ring groove among piston rings which have different load length ratios Rmr2 in surface quality at the top face and the bottom face thereof.

It is noted that upon conducting the present confirmation test for wear amount, the engine was operated at a full load (wide open throttle) and at a rotational speed of 1800 rpm for 50 hours. Further, the combination of piston rings was a 3-ring set including a top ring, a second ring, and an oil ring. The top ring used in this event was a keystone ring made of 17-Cr steel, and having an axial height of 3.5 mm and a radial thickness of 4.7 mm, which was subjected to a gas nitriding treatment. The second ring used was made of a FCD material and had an axial height of 2.5 mm and a radial thickness of 5.4 mm. The oil ring used had an axial height of 3.0 mm and a radial thickness of 2.35 mm.

The 17-Cr steel for making up the top ring and the FCD700 material for making up the second ring will be described. The 17-Cr steel herein referred to had a composition of 0.90% by mass of carbon, 0.40% by mass of silicon, 0.30% by mass of manganese, 17.5% by mass of chromium, 1.10% by mass of molybdenum, 0.12% by mass of vanadium, 0.02% by mass of phosphorous, and 0.01% by mass of sulfur, the balance being iron and inevitable impurities, and was applied with a gas nitriding treatment, and the outer peripheral sliding surface of the top ring was applied with a PVD treatment. That is, the 17 Cr-steel corresponds to SUS440B of JIS standard. Further, the FCD material referred to herein was a material corresponding to FCD 700 material and having a composition of 3.60% by mass of carbon, 3.05% by mass of silicon, 0.65% by mass of manganese, 0.20% by mass of phosphorous, 0.02% by mass of sulfur, 0.10% by mass of chromium, and 0.30% by mass of copper, the balance being iron and inevitable impurities.

Further, the oil ring body used was so-called 13-Cr steel (which corresponds to SUS410 of JIS standard) having a composition of 0.65% by mass of carbon, 0.38% by mass of silicon, 0.35% by mass of manganese, 13.50% by mass of chromium, 0.3% by mass of molybdenum, 0.01% by mass of phosphorous, and 0.01% by mass of sulfur, the balance being iron and inevitable impurities, and was applied with a gas nitriding treatment.

Moreover, upon conducting the present confirmation test for wear amount, the material used as the piston corresponded to 42CrMo4 in DIN standard (SCM440H in JIS standard) and had a composition of 0.41% by mass of carbon, 0.2% by mass of silicon, 0.75% by mass of manganese, 0.02% by mass of phosphorous, 0.02% by mass of sulfur, 1.1% by mass of chromium, and 0.21% by mass of molybdenum, the balance being iron and inevitable impurities.

Further, the roughness of the top and bottom faces of the used piston ring groove was not more than 2 μm in 10-point average roughness RzJIS (JIS B 0601:2001).

The result of the confirmation test for wear amount of piston ring grooves of the top ring performed at the conditions described above are shown in Table 1. Table 1 shows the result of confirming the wear amount of piston ring groove at each engine operating time, between an Example specimen in which the load length ratio Rmr2 of the surface at the top face and the bottom face of the piston ring was within the condition range of the present invention, and a Comparative Example specimen which is out of the condition range of the present invention (corresponding to conventional products). As a result, in FIG. 3, the relation between the ring groove wear ratio and the engine operating time (hr) in the Example of the present invention and the Comparative Example is shown in a graph. Where, the ring wear ratio is shown in a relative ratio with the maximum wear amount of the Example specimen being "1".

It is noted that upon conducting the present confirmation test for wear amount, the load length ratios Rmr2 in the top face and the bottom face of the piston ring were measured at the top face and the bottom face of the piston ring in the radial direction by using a stylus-type surface profilometer with a stylus of 2 μm R (radius).

Comparison Between Example and Comparative Example

Figure 3:
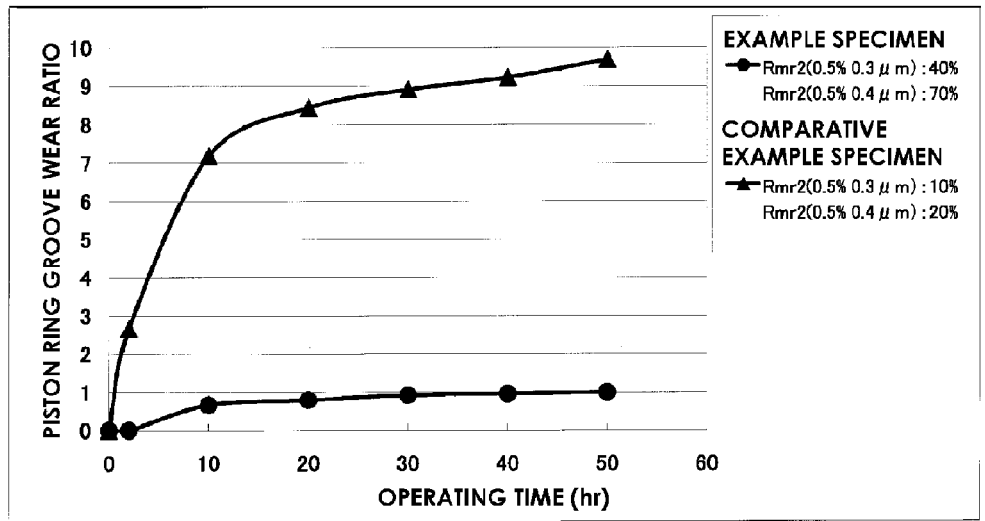
FIG. 3 is a graph to show the relationship between a ring groove wear ratio and an engine operating time (hr) in an Example and a Comparable Example of the present invention.

Hereafter, comparison between an Example of the present invention and a Comparative Example corresponding thereto is made with reference to Table 1 and FIG. 3 which show the result of performing the confirmation test for wear amount of piston ring groove.

TABLE 1

| | Piston ring groove wear ratio | |
|---|---|---|
| | Example | Comparative Example |
| | Surface roughness of top face and bottom face of piston ring | |
| Operating time (hr) | Rmr2 (0.5% 0.3 μm): 40% Rmr2 (0.5% 0.4 μm): 70% | Rmr2 (0.5% 0.3 μm): 10% Rmr2 (0.5% 0.4 μm): 20% |
| 0 | 0.00 | 0.00 |
| 2 | 0.00 | 2.66 |
| 10 | 0.67 | 7.19 |
| 20 | 0.79 | 8.44 |
| 30 | 0.92 | 8.91 |
| 40 | 0.96 | 9.22 |
| 50 | 1.00 | 9.69 |

From Table 1 and FIG. 3, particularly, in a so-called running-in period up to 10 hours of engine operating time, a significant difference resulted in the wear amount of the piston ring groove between the Example specimen and the Comparative Example specimen. For example, from Table 1, after an elapse of 10 hours of engine operating time, while the piston ring groove wear ratio is 0.67 when the Example specimen was used, the piston ring groove wear ratio is 7.19 when the Comparative Example specimen was used, thus showing a large difference. After an elapse of 50 hours of engine operating time, while the piston ring groove wear ratio is 1.00 when the Example specimen was used, the piston ring groove wear ratio was 9.69 when the Comparative Example specimen was used, showing an expanded difference. From this result, it has been proved that if a piston ring has a load length ratio Rmr2 of the surface that satisfies the condition range of the present invention at the top face and the bottom face, the piston ring is less likely to cause adhesive wear between itself and the piston during a running-in period, and can exert excellent suppressing effect of adhesive wear even when many hours passes. That is, based on this result, it can be concluded that suppressing the occurrence of adhesion on the surface of the piston ring during the running-in period enables to prevent the occurrence of adhesion from becoming pronounced thereafter, and suppress the progress of the wear of the piston ring groove.

Based on what has been described so far, further preferable conditions for suppressing the occurrence of adhesion on the surface of a piston ring will be discussed.

Confirmation Test for Adhesion Occurrence of Piston Ring in Running-In Period:

It is noted that upon conducting the present confirmation test for adhesion occurrence, as a specific configuration, the "ABRASION TESTING MACHINE FOR EVALUATING ABRASION OF BOTH OR EITHER OF PISTON RING OR PISTON RING GROOVE" disclosed in Japanese Patent Laid-Open No. 2008-76132 previously applied by the present applicants was adopted. Further, in the present confirmation test for adhesion occurrence, the driving frequency of a driving source was controlled to be 33 Hz, and temperature was control such that temperature at the bottom of ring groove was 200° C. Further, the gas pressure was controlled to be 0.5 MPa. Further, lubrication oil was continuously fed in such a way that after the lubrication oil was fed for 30 minutes at a feed rate of 1 ml/30 sec, the feed amount of lubrication oil was decreased every time one hour elapsed. The total time for performing the present confirmation test for adhesion occurrence was determined to be 25 hours. It is noted however that if a phenomenon of increase in blow-by, which means a progress of adhesion, occurred before 25 hours had passed from the start of test, and the measurement of blow-by amount was disabled, the test was ended at that point.

Further, in the present confirmation test for adhesion occurrence, test was conducted at the conditions described above by using six kinds of specimens which were respectively different regarding the surface quality of piston ring. At this moment, as in the above described confirmation test for wear amount of piston ring groove, the piston ring used was a combination of a top ring, a second ring, and an oil ring, and the second ring and the oil ring were the same as those used in the concerned confirmation test for wear amount. Further, upon conducting the present confirmation test for adhesion occurrence, as for the portion corresponding to piston, the same as that used in the concerned confirmation test for wear amount was adopted. Regarding the top ring used in the present confirmation test for adhesion occurrence, a ring having the same geometries as that used in the concerned confirmation test for wear amount excepting the condition of the load length ratio Rmr2 of the surface at the top face and the bottom face of the piston ring was used.

In the present confirmation test for adhesion occurrence, concerning the surface quality of the top face and the bottom face of the top ring, correlation between the relation between numerical values (%) of Rmr2 and the depth z(Co−Cn (μm)) with a load length ratio Rmr2(Rmr(Co)=0.5%) as being a reference, and the occurrence of adhesion was investigated. The reason why the case of Rmr(Co) being 0.5% was used as the reference here was because, as already described, as a rule of thumb, it was possible to make the piston ring less aggressive against the piston ring groove, and to stably achieve the effect of sufficiently suppressing the occurrence of adhesive wear.

Figure 4:
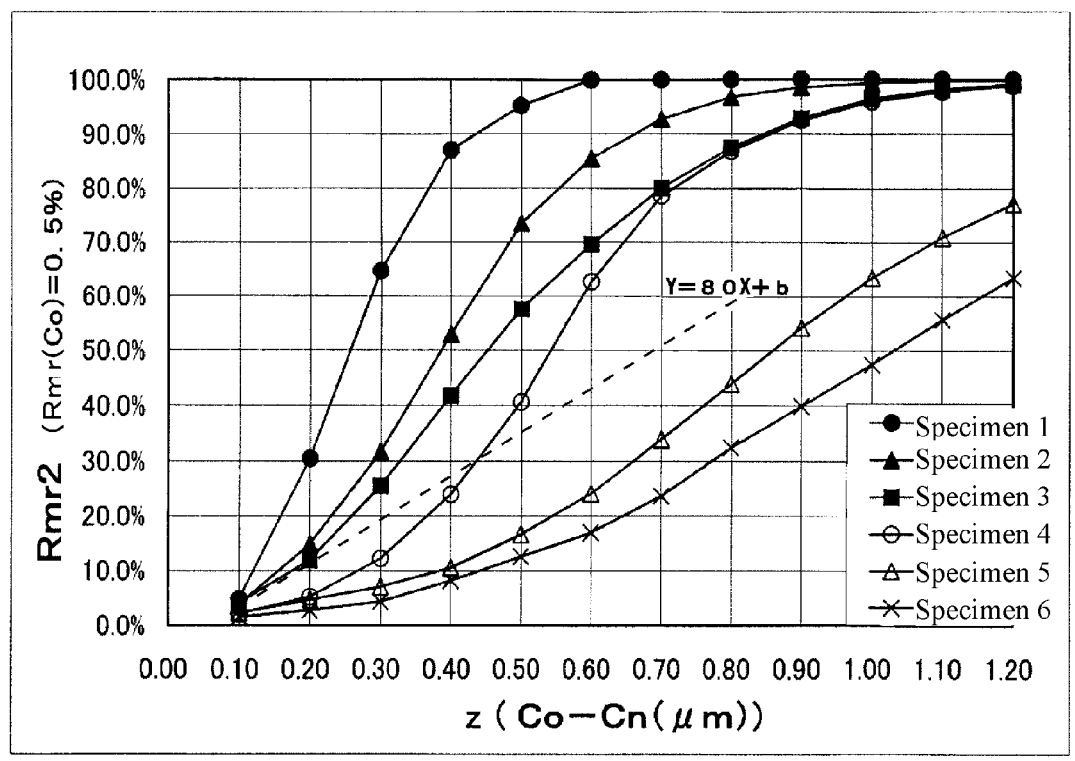
FIG. 4 is a graph to show the relationship between the load length ratio Rmr2(Rmr(Co)=0.5%) and the wear depth z(Co−Cn (μm)) in Examples and Comparative Examples of the present invention.

Table 2 shows the results of the confirmation test for adhesive wear, which was conducted by using the wear test apparatus, when conducting the present confirmation test for adhesion occurrence. Further, FIG. 4 shows the data of Table 2 in a graph showing the relationship between the load length ratio Rmr2(Rmr(Co)=0.5%) and the wear depth z(Co−Cn (μm)) in each specimen. It is noted that in Table 2, the results of the present confirmation test for adhesion occurrence are shown as: "A" indicates no occurrence of adhesion, "B" indicates occurrence of color change, and "C" indicates occurrence of adhesion. Further, regarding the judgment criteria for the result of performing the present confirmation test for adhesion occurrence, cases where adhesion occurred at the top and bottom faces of the piston ring even at once in the results of a total of five tests, and color change occurred not less than three times, were judged to be NG, and other cases were judged to be OK. Here, a color change is a phenomenon that appears due to a damage of the top and bottom faces of a piston ring and which is perceived as a foreshadow of the occurrence of adhesion although no adhesion has occurred yet.

mens 1 to 3 was OK and that for specimens 4 to 6 was NG. Here, the piston rings of specimens 1 to 3 are those having a surface quality in which the load length ratio Rmr2 of the surface at the top face and the bottom face of the top ring is within the condition range of the present invention. On the other hand, the piston rings of specimens 4 to 6 are those having a surface quality in which the load length ratio Rmr2 is out of the condition range of the present invention. Therefore, from this result, as well as from the above described confirmation test for wear amount of piston ring groove, it has been proved that if the load length ratio Rmr2 of the surface at the top face and the bottom face of a piston ring satisfies the condition range of the present invention, the piston ring is less likely to be subject to adhesive wear between itself and the piston.

Moreover, from Table 2, regarding specimens 1 and 2, there was no single occurrence of adhesion at the top and bottom faces of the top ring in the five tests in total. Further, regarding specimens 3 and 4, although there was no single occurrence of adhesion at the top and bottom faces of the top ring in the five tests in total, the occurrence of color change was observed. Further, regarding specimens 5 and 6, the occurrence of adhesion and color change at the top and bottom faces of the piston ring was observed in the five tests in total. Here, regarding specimen 3, judgment was OK since the number of the occurrence of color change was two, and regarding specimen 4, judgment was NG since the number of the occurrence of color change was three. Referring to FIG. 4 based on these results, it is seen that a specimen, which shows a larger rate of increase of the numerical value (%) of the load length ratio Rmr2 of the surface in association with an increase of the depth z(Co−Cn (μm)), has a larger effect of suppressing the occurrence of adhesion. That is, upon determining a critical value between OK and NG from the data of specimens 3 and 4, FIG. 4 can be taken into consideration.

TABLE 2

|  | z = Co − Cn(μm) | Specimen 1 | Specimen 2 | Specimen 3 | Specimen 4 | Specimen 5 | Specimen 6 |
| --- | --- | --- | --- | --- | --- | --- | --- |
| Rmr2 | 0.10 | 4.81% | 3.76% | 4.00% | 2.03% | 2.20% | 1.49% |
| (Co = 0.5%) | 0.20 | 30.46% | 14.81% | 11.93% | 5.22% | 4.66% | 2.74% |
|  | 0.30 | 64.71% | 31.67% | 25.46% | 12.22% | 7.06% | 4.38% |
|  | 0.40 | 87.04% | 52.92% | 41.83% | 23.92% | 10.55% | 8.16% |
|  | 0.50 | 95.24% | 73.47% | 57.62% | 40.64% | 16.62% | 12.55% |
|  | 0.60 | 100.00% | 85.44% | 69.66% | 62.70% | 24.05% | 16.89% |
|  | 0.70 | 100.00% | 92.71% | 80.13% | 78.63% | 33.91% | 23.60% |
|  | 0.80 | 100.00% | 96.75% | 87.51% | 86.87% | 43.94% | 32.43% |
|  | 0.90 | 100.00% | 98.51% | 92.86% | 92.51% | 54.20% | 39.87% |
|  | 1.00 | 100.00% | 99.28% | 96.42% | 95.92% | 63.47% | 47.46% |
|  | 1.10 | 100.00% | 99.69% | 98.20% | 97.79% | 70.98% | 55.71% |
|  | 1.20 | 100.00% | 99.76% | 99.06% | 98.84% | 77.17% | 63.50% |
|  | 1.30 | 100.00% | 99.78% | 99.33% | 99.40% | 83.64% | 70.00% |
|  | 1.40 | 100.00% | 99.83% | 99.38% | 99.77% | 89.67% | 74.21% |
| Gradient (*1) | 0.10-0.30 | 360 | 140 | 107 | 51 | 24 | 15 |
| Adhesion test | First test | A | A | B | B | B | B |
| result (*2) | Second test | A | A | A | A | C | B |
|  | Third test | A | A | B | B | B | C |
|  | Fourth test | A | A | A | B | B | C |
|  | Fifth test | A | A | A | B | C | C |
|  | Judgment (*3) | OK | OK | OK | NG | NG | NG |

(*1) Gradient of straight line connecting data points of Rmr2 (%) where z(Co − Cn(μm)) is 0.1 and 0.3, respectively.
(*2) A: Non-occurrence of adhesion, B: Occurrence of color change, C: Occurrence of adhesion
(*3) One or more occurrences of adhesion, or three or more occurrences of color change mean NG, and otherwise mean OK.

Evaluation Result of Confirmation Test for Adhesion Occurrence

As shown in Table 2, as the result of the present confirmation test for adhesion occurrence, the judgment for speci- Referring to FIG. 4, it is preferable to take into consideration the shape of an approximation curve drawn for data points of the relationship between the depth z(Co−Cn (μm)) and the Rmr2(%) for each specimen as a factor to clearly reveal the difference between specimens 1 to 3 for which judgment was OK and specimens 4 to 6 for which judgment was NG. For example, by drawing a straight line connecting data points of the concerned Rmr2 where the concerned depth z(Co–Cn (μm)) is 0.1 and 0.3 among the data points of the relationship between the depth z(Co–Cn (μm)) and the Rmr2(%) in a range of 0.1 to 0.3, and considering the gradient of this straight line, it becomes possible to stably achieve a good performance. Table 2 shows numerical values of the gradients of straight lines that connect data points of each Rmr2(%) where the concerned z is 0.1 μm and 0.3 μm. From Table 2, the gradients of the concerned straight lines are 360 for specimen 1, 140 for specimen 2, 107 for specimen 3, 51 for specimen 4, 24 for specimen 5, and 15 for specimen 6. That is, from this result, it is seen that the gradients of straight lines for specimens 1 to 3 are greater than the gradients of straight lines for specimens 4 to 6.

Thus, when determining a critical value between OK and NG from the data of specimens 3 and 4 taking into consideration of FIG. 4, it is preferable to judge from the gradient of a straight line connecting data points of each of the concerned Rmr2 where the depth z(Co–Cn (μm)) is 0.1 and 0.3. Viewed from the condition of Rmr2(%), it can be judged from FIG. 4 and Table 2 that the critical value between OK and NG should be set at a middle between the condition of specimen 3 and the condition of specimen 4. Therefore, regarding the gradient of the straight line, it is appropriate to consider that a critical gradient exists between a gradient of 107 for specimen 3 and a gradient of 51 for specimen 4. From the experiences of the inventors as well, it has been found that when the gradient of this straight line is not less than 80, good result can be obtained. That is, the surface quality of the top and bottom faces of the piston ring relating to the present invention are preferably determined such that the gradient of a straight line connecting data points of each Rmr2 at a depth z of 0.1 μm and 0.3 μm is not less than 80 in the relationship between the load length ratio Rmr2 and the depth z(Co–Cn (μm)) when Rmr(Co) is 0.5%. It is noted that in FIG. 4, a straight line (dashed line in the figure) of Y=80X+b (b is a specific value determined for each base material at z of 0.1 μm) is extrapolated such that a straight line of a gradient of 80 can be imagined.

It is noted that in the present confirmation test for adhesion occurrence, a test is also conducted by using, besides 17-Cr steel as in the above-described confirmation test for wear amount of piston ring groove, 13-Cr steel (corresponding to SUS410 in JIS standard) as the material of the top ring which is a specimen. However, as a result of the present confirmation test for adhesion occurrence, the same result was obtained for the case where the material of the top ring was 13-Cr steel as in the case of 17-Cr steel shown in Table 2.

From what has been described so far, when a piston ring having a surface quality in which the load length ratio Rmr2 of the surface at the top face and the bottom face of the piston ring is within the condition range of the present invention, it is possible to achieve excellent effect of suppressing adhesive wear even when many hours elapses.

INDUSTRIAL APPLICABILITY

As the result of the load length ratio Rmr2 (conforming to JIS B 0601:2001) of the surface at the top face and the bottom face of the piston ring satisfying each condition of (0.5%, 0.3 μm)≥20% and (0.5%, 0.4 μm)≥40%, the piston ring of the present invention can sufficiently suppress the occurrence of adhesive wear when it is mounted on a piston in which at least the piston ring groove is made of steel or cast iron. Thus, since adopting the piston ring of the present invention enables the reduction of oil consumption in every range of engine revolution, it is possible to respond a wide range of needs such as high-power specification engines, and the like.

REFERENCE SIGNS LIST

1 Piston ring
2 Top face of piston ring
3 Bottom face of piston ring
4 Sliding surface of piston ring
5 Piston
6 Piston groove
7 Upper side face of piston groove
8 Lower side face of piston groove
9 Cylinder
10 Cylinder inner wall surface
11 Hard layer
12 Wear resistant layer

The invention claimed is:

1. A piston ring (1) to be mounted on a groove (6) of a piston within acylinder (9) of a diesel engine, said piston ring (1) comprising:
   a top face (2) opposite a bottom face (3),
   an inner side face that extends between the top and bottom faces along an inner circumference of the ring, and
   an outer side face (4) that extends between the top and bottom faces along an outer circumference of the piston ring,
   wherein the outer side face (4) defines a sliding surface of the piston ring against an inner wall surface (10) of the cylinder (9),
   wherein the top face (2) is configured to have a first surface property after a predetermined initial wear and the bottom face (3) is configured to have a second surface property after the predetermined initial wear,
   wherein the first surface property of the top face (2) of the piston ring has a load length ratio Rmr2 that satisfies each condition of Formula (1) and Formula (2) below, and
   wherein the second surface property of the bottom face (3) of the piston ring has a load length ratio Rmr2 that satisfies each condition of Formula (1) and Formula (2) below:

$$Rmr2(0.5\%, 0.3\mu m) \geq 20\% \qquad (1), \text{ and}$$

$$Rmr2(0.5\%, 0.4\mu m) \geq 40\% \qquad (2).$$

2. The piston ring according to claim 1, wherein a hard layer is formed on the top face and the bottom face of the piston ring, and Vickers hardness (HV) in the hard layer is 700 HV0.1 to 3000 HV0.1.

3. The piston ring according to claim 2, wherein the piston ring is made of steel or cast iron, and the hard layer formed on the top face and the bottom face of the piston ring is a diamond-like carbon layer.

4. The piston ring according to claim 1, wherein a cross-section of the piston ring along a piston axis direction has a shape of any of a rectangular shape, a keystone shape, and a half-keystone shape.

5. The piston ring according to claim 1 in combination with a piston with a piston ring groove, wherein the piston ring is located in the piston ring groove and the piston ring groove is made of steel or cast iron.

6. The piston ring according to claim 2, wherein the piston ring is made of steel or cast iron, and the hard layer formed on the top face and the bottom face of the piston ring is a nitrided layer.

7. The piston ring according to claim 2, wherein the piston ring is made of steel or cast iron, and the hard layer formed on the top face and the bottom face of the piston ring is a chromium plated layer.

8. The piston ring according to claim 2, wherein the piston ring is made of steel or cast iron, and the hard layer formed on the top face and the bottom face of the piston ring is a PVD treated layer.

9. The piston ring according to claim 2, wherein a cross-section of the piston ring along a piston axis direction has a shape of any of a rectangular shape, a keystone shape, and a half-keystone shape.

10. The piston ring according to claim 2 in combination with a piston with a piston ring groove, wherein the piston ring is located in the piston ring groove and the piston ring groove is made of steel or cast iron.

11. The piston ring according to claim 2, wherein the piston ring is made of steel or cast iron, and the hard layer formed on the top face and the bottom face of the piston ring is a CVD treated layer.

* * * * *